Nov. 22, 1966  A. BUSKE  3,287,072
SLIDING FRICTION BEARING HAVING LUBRICATION POCKETS
AND SHAFT OUTFITTED THEREWITH
Filed Dec. 3, 1963

*Inventor:*
ALFRED BUSKE
BY
Burgus Dinklage and
Sprung ATTORNEYS.

United States Patent Office 3,287,072
Patented Nov. 22, 1966

3,287,072
SLIDING FRICTION BEARING HAVING LUBRICATION POCKETS AND SHAFT OUTFITTED THEREWITH
Alfred Buske, Neckarsulm, Wurttemberg, Germany, assignor to Karl Schmidt G.m.b.H., Neckarsulm, Wurttemburg, Germany, a corporation of Germany
Filed Dec. 3, 1963, Ser. No. 327,614
9 Claims. (Cl. 308—122)

The present invention relates to a special design of lubricating pockets in friction bearings. In the known friction bearing designs the lubricant is commonly fed either directly through the holes or through distribution grooves or lubricating pockets into the lubrication clearance between shaft and bearing sleeve. The grooves may be, for example, machines spirally into the bearing surface in the axial direction. The lubricating pockets commonly have the form of a rectangle and are disposed laterally in the unstressed portion of the bearing.

The lubricating film thickness in friction bearings averages from a few thousandths to a hundredths of a millimeter. In order to achieve good running and long life, it is necessary that the lubricant be supplied in the purest possible condition. Consequently it has hitherto been common to install oil filters in the main oil feed line. These filters, cannot be designed in such a manner as to keep the oil free of the smallest dirt particles, since in this case its resistance to flow would become excessive. In ordinary installations, the clearance of the mesh size of the filter amounts to several times that of the bearing clearance. The bearing surfaces are thus exposed at least to destruction by the dirt particles that the filters permit to pass through them.

The invention eliminates this disadvantage by a special design of a lubricating pocket. The foreign bodies contained in the lubricant are, in the new design of the lubricating pockets, deflected longitudinally outwards toward the edges of the bearings. To achieve this effect, the lubricating pocket edge over which the oil enters into the lubricating clearance departs from the form of a straight, axially oriented generatrix of the cylindrical bearing surface. The pockets are in the area of incipient oil film pressure and the discharge edge of the pockets extends with uniform or increasing inclination toward the direction of lubricant discharge at an acute angle to the generatrix of the bearing.

According to the invention, the lubrication pocket has at least one peripheral edge portion disposed for oil discharge from the pocket for lubrication of the bearing, and a portion of the said peripheral edge is inclined with respect to the bearing axis and extends to termination adjacent an end of the bearing.

Embodiments of the invention are depicted in the accompanying drawing, wherein.

Figure 2:
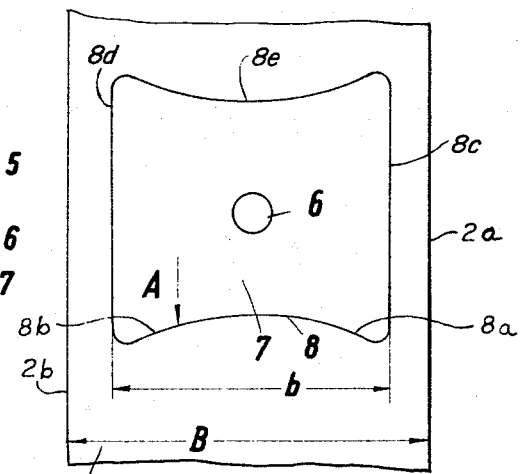
FIG. 2 is an elevation view of the bearing shown in FIG. 1, viewed as is indicated by the arrow Z in FIG. 1.
Figure 3:
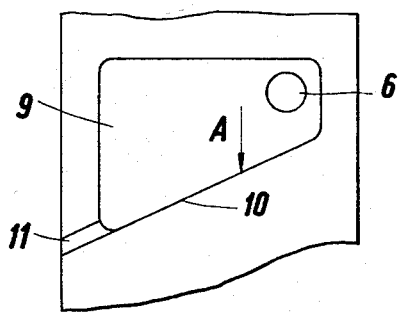
Figure 4:
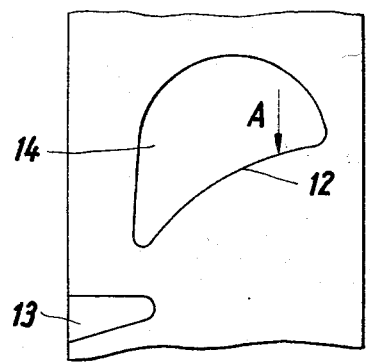
Figure 5:
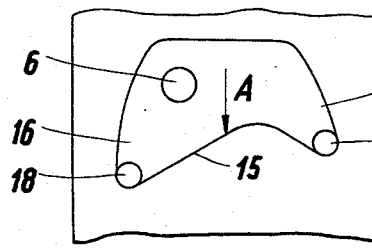
Figure 6:
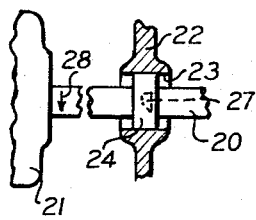

FIG. 3, FIG. 4, and FIG. 5 are views, corresponding with the views shown in FIG. 2, and indicating modified forms of construction for the pocket; and FIG. 6 is a view showing a shaft with motor drive, the shaft being outfitted with a sliding friction bearing having a lubricating pocket, according to the invention.

In the various views of the drawing, like reference characters indicate corresponding parts.

The arrows marked A indicate the running direction of the shaft and the direction of flow of the lubricant.

Figure 1:
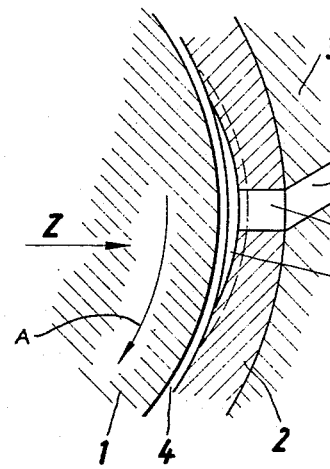
FIG. 1 is a cross-sectional view of a shaft-sliding bearing assembly, the sliding or friction bearing being provided with a pocket according to the invention.

FIG. 1 shows the cross-section of a friction bearing in which the shaft 1 runs in a bearing bushing or bearing sleeve 2, which is pressed into a housing 3. Between shaft 1 and bearing bushing 2 is the bearing clearance 4 filled with lubricant. The lubricant is fed to the bearing through the oil passage 5 in housing 3, which communicates with a hole 6 in bushing 2. The hole 6 terminates in the lubricating pocket 7.

The special shape of the lubricating pocket 7 according to the invention is apparent from FIG. 2, which shows an elevation view of the bearing bushing 2 of FIG. 1, in the direction of the arrow Z.

The lubricating pocket 7 having the breadth $b$ is provided in the bearing 2 having the breadth B. The lubricating pocket is filled by the feeding of the lubricant through the hole 6 located in the center of the bearing. The lubricant runs over the arcuate lubricating edge 8 into the lubrication clearance of the running surfaces of the bearing. Lubricating pocket peripheral edge 8 is inclined in the form of a curved line, in relation to the generatrices of the bearing surface, from the center of the bearing towards both edges of the bearing, in the direction of the lubricant flow. The edge 8 is arcuate in front elevation, as is indicated in FIG. 2. When the lubricating oil passes out of lubricating pocket 7 over edge 8 into the bearing clearance, foreign bodies in the oil current are deflected outwards towards the margins of the bearing into the corners of the lubricating pocket. The middle portion of the bearing, which is the one which mainly bears the load of the bearing, remains free of foreign bodies in the lubricant, due to this formation of the edge of the lubricating pocket, so that the running surfaces of journals and bearings are not damaged in this area by the foreign bodies, and the loading capacity of the bearing is not diminished. In experiments which were performed with such bearings, it developed that the foreign bodies drift along through the current of lubricant at the edge of the lubricating pocket, some of them settling or embedding themselves in the material of the bearings on the margins of the latter outside of the breadth $b$ of the lubricating pocket. Most of the foreign bodies, however, depart from the bearing over the short path between the lubricating pocket breadth $b$ and the bearing breadth B, in the unloaded portion of the bearing surface, without settling in the bushing and damaging the latter and the shaft.

The ratio of $b$ and B can be about 0.5–0.85, preferably 0.6–0.8.

In the embodiment shown in FIG. 2, the discharge edge B includes a first edge portion 8a and a second edge portion 8b and these edge portions are inclined to guide the oil toward each end of the bearing. The edge portion 8a extends to termination adjacent end 2a of the bearing and edge portion 8b extends to termination adjacent end 2b of the bearing.

The location of the oil inlet 6 in the embodiment is a preferred location since it is disposed so that oil flow will be outwardly along each edge portions 8a and 8b. The inlet 6 communicates with the pocket 7 at a locus remote from the respective terminations of the edge portions 8a and 8b which terminations are adjacent the ends of the bearing.

As is indicated in FIG. 1 and FIG. 2, lubrication pocket 7 is preferably disposed in the area of incipient lubricant film pressure, and, more particularly, so that the discharge edge of the pocket is disposed in this area. Thus, referring to FIG. 2, the discharge edge 8b is in the area of incipient film pressure. The pocket is indicated by the edges thereof, 8, 8c, 8d and 8e.

While the bearing of the invention can include an oil inlet such as inlet 6 to the pocket 7 in FIG. 2, the inlet is not necessary since, as is known in the art, oil can be supplied to the pocket in other ways.

FIGS. 3 to 5 show other forms of lubricating pockets. In FIG. 3 and FIG. 5, the bearing includes an oil outlet for discharge of oil from the pockets and from the bearing. The oil outlet communicates with the pocket adjacent the termination of the peripheral edge over which oil is discharged from the pocket. In the embodiment shown in FIG. 4, the bearing includes an oil outlet for discharge of oil from the bearing, and said outlet communicates with the bearing surface for receiving oil from the bearing surface at a locus of the bearing surface adjacent the termination of the peripheral edge and circumferentially spaced from the termination of the peripheral edge in the direction of inclination of the peripheral edge, and it is inclined towards the bearing and adjacent to which the peripheral edge ends.

In FIG. 3, the edge 10 of lubricating pocket 9 runs rectilinearly from adjacent one side of the bearing to adjacent the other at an acute angle to the generatrix of the bearing. The peripheral edge 10 is a straight line in front elevation. On this account, the dirt particles in the lubricant are deflected to one side of the bearing and can escape from the bearing through a groove 11 which joins the lubricating pocket edge 10.

In case the oil pumping pressure in bearings with forced oil circulation is lowered by the outwardly leading groove passage 11, a dirt-removing passage of the kind shown in FIG. 3 is not appropriate. As a rule, however, such a passage 11 is not necessary, because if the distance between the lubricating pocket and the edge of the bearing is not too great, the effect of the dirt-deflecting pocket edge suffices to keep the bearing clean in the load-bearing middle portion.

In FIG. 4, the dirt-deflecting edge of the lubricating pocket follows a curved line 12. In order to obtain a sealing of the lubricating pocket from the outside and nevertheless to remove as much as possible of the foreign matter entirely from the bearing, in the case of sensitive bearings, a small dirt outlet passage 13 is provided in the bearing surface below he lubricating pocket in the direction of flow of the lubricant, the said passage being spaced from and not communicating with the lubricating pocket 14. The foreign bodies in the lubricant supply, which enter the lubricating pocket 14 through the oil feed hole 6, are carried away with the current of lubricant along the lubricating pocket edge 12 to the left side of the lubricating pocket in the drawing. Dirt particles which do not leave the bearing in this direction of flow, but are driven by the rotating shaft out of the corner of the pocket into the bearing clearance, arrive a short time later at the dirt removal passage 13, and are carried away through the latter. The spacing between the pocket 14 and dirt removal passage can be about 3–25°, preferably 8–15°, of the bearing circle.

FIG. 5 shows a form of the dirt deflecting edge 15 of the lubricating pocket, which is not symmetrical with the center of the bearing, and which has holes 18 and 19 in the corners 16 and 17 of the pocket, in which the dirt particles collect. The dirt particles are carried by these holes outwardly from the bearing surface and can pass through them out of the bearing.

In order to prevent a drop in the oil pumping pressure, it is appropriate to arrange holes 18 and 19 outside of the lubricating pocket, below the corners of the pocket in the direction of rotation of the shaft. See the description of the bearing shown in FIG. 4.

A shaft with drive means and outfitted with a bearing having a lubricating pocket in accordance to the invention, is indicated in FIG. 6. The shaft 20 is driven by motor 21 and passes through the housing 22 having a bore 23 in which it receives the sliding friction bearing 24. The sliding friction bearing 24 is provided with a lubricating pocket 27 according to the invention. The shaft rotates in the direction indicated by the arrow 28. As the shaft journal surface passes the pocket, it moves toward the peripheral discharge edge.

While the invention has been described in respect to particular embodiments thereof, it will be understood that these embodiments are merely representative and do not serve to set forth the limits of the invention.

What is claimed is:

1. In combination, a horizontally disposed shaft outfitted with a fixedly positioned radial friction bearing having a circumferentially continuous bearing surface with a lubrication pocket formed as a recess in a side portion thereof, said pocket having at least one peripheral edge for oil discharge from the pocket for lubrication of the bearing, said peripheral edge being substantially continuously inclined with respect to the bearing axis downwardly to a locus of termination adjacent an end of the bearing, means for rotating the shaft so that the shaft journal surface as is passes said pocket can move from a leading edge of the pocket toward said peripheral edge, said locus of said termination of the peripheral edge being located in the low pressure area of incipient film pressure whereby foreign bodies in a lubricant contained in said pocket are deflected toward said end of the bearing.

2. Combination according to claim 1, said bearing including an oil outlet for discharge of oil from the pocket and from the bearing and communicating with the pocket adjacent said locus of termination of said peripheral edge.

3. A friction bearing having a lubrication pocket, said pocket having at least one peripheral edge for oil discharge from the pocket for lubrication of the bearing, a portion of said peripheral edge being inclined with respect to the bearing axis downwardly to a locus of termination adjacent an end of the bearing, said bearing including an oil outlet for discharge of oil from the bearing, said outlet communicating with the bearing surface for receiving oil from the bearing surface at a locus of the bearing surface adjacent said termination of said peripheral edge and circumferentially spaced from said peripheral edge in the direction of inclination of said peripheral edge toward said bearing end.

4. A friction bearing having a lubrication pocket, said pocket having at least one peripheral edge for oil discharge from the pocket for lubrication of the bearing, a portion of said peripheral edge being inclined with respect to the bearing axis downwardly to a locus of termination adjacent an end of the bearing, said peripheral edge terminating short of said end toward which it is inclined, said bearing including an oil outlet for discharge of oil from the bearing, said outlet communicating with the bearing surface for receiving oil from the bearing surface at a locus of the bearing surface adjacent said termination of said peripheral edge and circumferentially spaced from said peripheral edge in the direction of inclination of said peripheral edge toward said bearing end.

5. Combination according to claim 1, wherein said peripheral edge, in front elevation, is arcuate.

6. Combination according to claim 1, wherein said peripheral edge, in front elevation is a straight line.

7. Combination according to claim 1, and including an oil inlet to the pocket, said inlet communicating with the pocket at a point remote from said locus and said end.

8. Combination according to claim 1, said pocket having a second peripheral edge as aforesaid and being substantially continuously inclined with respect to the bearing axis downwardly to a locus of termination adjacent the other end of the bearing.

9. A friction bearing according to claim 8 and having an oil inlet to the pocket, said inlet communicating with the pocket at a locus remote from the respective terminations of the first and second peripheral edges adjacent the bearing ends.

References Cited by the Examiner

UNITED STATES PATENTS

| | | | |
|---|---|---|---|
| 585,445 | 6/1897 | Lumb | 308—122 |
| 1,436,265 | 11/1922 | Kingsburg et al. | 308—160 |
| 1,906,715 | 5/1923 | Penick | 308—9 |

FOREIGN PATENTS

| | | |
|---|---|---|
| 103,610 | 6/1899 | Germany. |
| 771,681 | 4/1957 | Great Britain. |

DAVID J. WILLIAMOWSKY, *Primary Examiner.*

FRANK SUSKO, DON A. WAITE, *Examiners.*